United States Patent [19]

Callender et al.

[11] Patent Number: 4,842,177

[45] Date of Patent: Jun. 27, 1989

[54] AIR BEARING TAPE SUPPORT FOR GUIDING TAPE AND SENSING TAPE TENSION

[75] Inventors: Bernard L. Callender; William W. Chow; Thomas G. Osterday; William J. Rueger, all of Tucson, Ariz.

[73] Assignee: International Business Machines Corporation, Armonk, N.Y.

[21] Appl. No.: 940,208

[22] Filed: Dec. 15, 1986

Related U.S. Application Data

[63] Continuation of Ser. No. 787,007, Oct. 11, 1985, abandoned, which is a continuation of Ser. No. 557,571, Dec. 2, 1983, abandoned.

[51] Int. Cl.$^4$ ............... B65H 20/14; B65H 23/02; G01L 5/08
[52] U.S. Cl. .......................... 226/97; 73/159; 226/196
[58] Field of Search ............. 226/7, 97, 196; 73/754, 73/37.7, 159, 862.58; 242/76

[56] References Cited

U.S. PATENT DOCUMENTS

| | | | |
|---|---|---|---|
| 2,988,294 | 6/1961 | Neff | 242/55.12 |
| 3,087,664 | 4/1963 | Streeter | 226/97 |
| 3,156,398 | 11/1964 | Lauxen et al. | 226/97 |
| 3,186,326 | 6/1965 | Schmidt | 226/97 X |
| 3,201,985 | 8/1965 | Williams | 73/862.07 |
| 3,281,040 | 10/1966 | Grant | 226/97 |
| 3,323,358 | 6/1967 | Fraioli | 73/754 X |
| 3,375,963 | 4/1968 | Wang et al. | 226/178 |
| 3,379,390 | 4/1968 | De Hertel-Eastcott | 242/75.44 |
| 3,386,681 | 6/1968 | Waterhouse et al. | 242/75.44 |
| 3,406,572 | 10/1968 | Robillard | 73/754 X |
| 3,472,439 | 10/1969 | De Hertel Eastcott | 226/195 |
| 3,602,412 | 8/1971 | Altonji et al. | 226/97 |
| 3,845,434 | 10/1974 | Carter | 73/144 |
| 3,868,851 | 3/1975 | Breyer | 73/144 |
| 4,019,388 | 4/1977 | Hall, II et al. | 73/754 |
| 4,282,998 | 8/1981 | Peekna | 226/97 |
| 4,314,225 | 2/1982 | Tominaga et al. | 73/754 X |
| 4,461,432 | 7/1984 | Hutzenlaub | 226/97 X |

FOREIGN PATENT DOCUMENTS

| | | |
|---|---|---|
| 40464 | 11/1981 | European Pat. Off. . |
| 1129745 | 5/1962 | Fed. Rep. of Germany . |
| 1241642 | 6/1967 | Fed. Rep. of Germany . |
| 1265042 | 5/1961 | France . |
| 1032074 | 6/1966 | United Kingdom . |

OTHER PUBLICATIONS

IBM Technical Disclosure Bulletin, vol. 25, No. 1, Jun. 1982, "Tape Tension Control", pp. 444–446, to R. Andresen, et al.

Primary Examiner—Harvey C. Hornsby
Assistant Examiner—Scott J. Haughland
Attorney, Agent, or Firm—M. W. Schecter; D. A. Mims, Jr.; M. H. Klitzman

[57] ABSTRACT

A tape support which provides several different functions in a reel-to-reel tape drive is disclosed. The tape support provides means for sensing tension in the tape, buffers or decouples the tape at the magnetic head from any perturbations arising at the take-up reel, and reliably guides the tape along the tape path. The tape travels along an arcuate surface of the tape support on an air bearing. A port in the arcuate surface senses pressure between the tape and the arcuate surface. This pressure is communicated to a transducer which provides an output representing the tension on the tape. Flanges on the ends of the tape support provide guiding of the tape over the air bearing and also provide venting of the air bearing to prevent tape vibration. A purge line expels a gaseous medium out of the sense port thereby keeping the sense port clear of contaminants.

2 Claims, 2 Drawing Sheets

AIR BEARING TAPE SUPPORT FOR GUIDING TAPE AND SENSING TAPE TENSION this application is a continuation of application Ser. No. 787,007, filed on Oct. 11, 1985, now abandoned, which is a continuation of application Ser. No. 557,571, filed on Dec. 2, 1983, now abandoned.

DESCRIPTION

1. Technical Field

This invention relates to an air bearing tape support in a tape drive which is capable of simultaneously guiding the tape over a tape path while sensing tape tension.

2. Background Art

Data processing systems have traditionally utilized magnetic tape as a data storage medium. Typically, the magnetic tape is wound and rewound between reels in a reel-to-reel tape drive. The magnetic tape is guided past a read-write head by bearings which provide an interface of forced air with the magnetic tape to lower friction forces between the tape and bearing surface and which permit rapid acceleration and deceleration of the magnetic tape. Since information is stored on the magnetic tape in a very dense format, it is necessary that the tape path be accurately controlled so as to provide accurate data writing and reading.

Three functions that a reel-to-reel tape drive must provide are: sensing tension in the tape; buffering or decoupling the tape at the magnetic head from any perturbations arising at the reels; and, reliably guiding the tape along the tape path. In conventional reel-to-reel tape drives, a separate station is required to accomplish each of these three functions. That is, a first apparatus senses tape tension, a second apparatus decouples the tape at the head from any perturbations arising at the reels, and a third apparatus guides the tape along the tape path. It would be most desirable in a reel-to-reel tape drive to have one station perform all of the these three required functions. Not only would such a station significantly decrease the cost of a reel-to-reel tape drive but it would also result in a more reliable tape drive having a single field replaceable unit instead of three field replaceable units. Additionally, using a single station over which the magnetic tape must pass substantially reduces the tendency for tape vibrations.

The use of a pressure transducer in a reel-to-reel tape drive to determine tape tension is known in the prior art. Typically, the tape is passed around an arcuate surface having apertures through which a gaseous medium can be supplied to provide a supporting gaseous cushion between the tape and the arcuate surface. The arcuate surface has one or more sense ports over which the tape passes. A pressure measuring device is connected with the sense ports for determining the pressure between the tape and the arcuate surface. Since tape tension is directly proportional to the pressure measured by the sense ports, the tension on the tape can be readily determined.

However, two problems arise which are not addressed by the prior art. The first problem arises when contaminants clog the sense port so that the pressure between tape and arcuate surface cannot be determined. The second problem arises as a result of vibratory movement of the tape across the arcuate surface. When tape vibrations occur, the distance between tape and sense port can change dramatically with an attendant loss in accuracy of pressure and hence tension measured. Additionally, the vibrating tape can come in contact with the sense port shutting it off and thus rendering the sense port useless as a pressure measuring device. The vibrations are induced by disturbances which are generated at the take-up reel in the tape drive. Tape vibration has a frequency of 100 cycles per second or higher whereas disturbance is irregular and has a frequency below 100 cycles per second.

As a result, it would be most desirable to provide a pressure measuring transducer having the ability to measure tape tension in the presence of contaminants. It would also be desirable to control tape vibratory motion by preventing disturbances at the take-up reel from inducing vibrations at the arcuate surface of the pressure transducer. This would enable more accurate measurement of the pressure existing between the moving tape and the arcuate surface around which the tape is passed. To accomplish these results, a purging means is provided for clearing a sense port of contaminants. Additionally, a guiding flange is provided which positively guides the tape in the tape drive while greatly reducing the vibratory motion of the tape.

Accordingly, it is an object of this invention to provide an improved reel-to-reel tape drive.

It is another object of this invention to provide a reel-to-reel tape drive wherein the functions of guiding, decoupling, and tension sensing are accomplished using a single tape drive station.

It is still another object of this invention to provide a reel-to-reel tape drive wherein a guiding flange provides positive guiding of the tape while simultaneously decoupling the tape from the tape reels so as to minimize tape vibration.

It is still a further object of this invention to provide a reel-to-reel tape drive wherein means are provided for clearing contaminants from the sense port in a pressure transducer used to determine tape tension.

DISCLOSURE OF THE INVENTION

The present invention relates to a tape support in a reel-to-reel tape drive which provides guiding of the tape, sensing of tape tension, and disturbance decoupling between the take-up reel and bearings which guide the tape over the read-write head. This tape support is connected to a solid state sensing transducer which is able to determine tape tension from the pressure measured between the tape and the surface of the tape support around which the tape passes.

A port in the surface of the tape support around which the tape passes is used to sense the pressure between the tape and the surface of the tape support. A sense line is connected between the port and the solid state sensing transducer. This sense line communicates the pressure measured at the port to the solid state sensing transducer. There is no air flow in this sense line. The compacting of air molecules within the sense line reflects the pressure sensed at the port. The compaction of air molecules provides to the solid state sensing transducer a measure of the pressure sensed at the port.

A purge line is located at the port end of the sense line. This purge line provides a continuous air flow out of the sense line. The tape support has a plenum through which air under pressure is directed. Apertures in the surface of the tape support allow this air to be directed over half of the surface of the tape support so as to provide an air cushion over which the tape passes. This air cushion is known in the art as a hydrostatic air bearing, and the surface over which the tape passes is known as an air bearing surface. The air bearing surface extends only over half of the tape support.

The purge line is connected to the same source of pressured air which provides the air bearing. Thus, as long as air is being provided under pressure through the apertures in the tape support, the purge line will also be operational to clear contaminants from the sense port. The continuous flow of air from the purge line out through the sense port reduces the possibility of the tape getting stuck on the sense port due to a vacuum in the sense line. If the tape were to become stuck on the sense port by a vacuum in the sense line, no more pressure sensing would be possible until the tape were removed from the sense port. If the tape seals the sense port for other reasons, such as high tape tension or sticking caused by friction (commonly called tape stiction), the purge line will increase pressure within the sense line to a maximum level. This increased pressure trips a tension error sensor in the solid state sensing transducer.

The tape support has a substantially cylindrical shape. The tape is passed along the arcuate surface of this substantially cylindrical tape support. Affixed to the top and bottom ends of the tape support are flanges which act to guide the tape. Each of the flanges is composed of two semidisk- shaped halves which are joined together so as to form one disk-shaped member. One half of the disk-shaped member has a peripheral portion of a thickness which is less than the thickness of the peripheral portion of the other half of the disk-shaped member. The thinner section of the disk-shaped member is located on the half of the tape support which has the air bearing surface over which the tape passes. The reduced thickness of the flanges on the air bearing side of the tape support forms vents so that the air from the apertures in the air bearing surface can escape and the edge of the tape will not be in contact with the flanges.

The vertical spacing between the top and bottom flanges on the air bearing side of the tape support is somewhat wider than the width of the tape. On the air bearing side of the tape support, the tape is free from vertical edge guiding. All vertical edge guiding occurs at the points where the flanges are thicker and the tape is not supported by an air bearing, i.e, where the two semidisk-shaped members are joined.

BRIEF DESCRIPTION OF THE DRAWING

FIG. 3b is a top view of a tape guiding flange shown in sectional view in FIG. 3a.

BEST MODE FOR CARRYING OUT THE INVENTION

Figure 1:
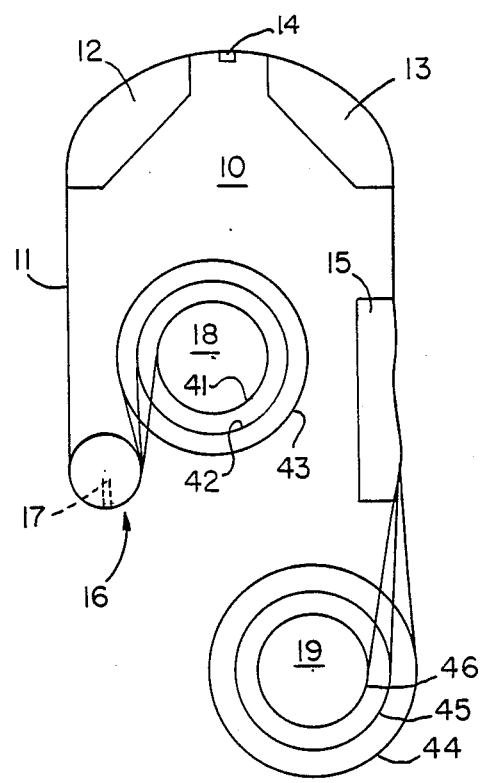
FIG. 1 is an illustration of a reel-to-reel magnetic tape drive according to the present invention.

Referring to FIG. 1, magnetic tape 11 is unwound from supply reel 19, traverses past read bearing 12, write bearing 13, magnetic head 14, decoupler column 15, tape support 16, and is wound onto take-up reel 18. Tape support 16 has a sense port 17 for determining the pressure existing between tape 11 and tape support 16. The tension on magnetic tape 11 can then be determined based upon the pressure sensed. As shown in FIG. 1, take-up reel 18 and supply reel 19 change diameter as the tape drive 10 is operated When supply reel 19 is first loaded into tape drive 10, it has a diameter represented by circle 44. At this time, take-up reel 18 has a diameter represented by circle 41. As the operation of tape drive 10 continues, supply reel 19 has a diameter represented by circle 45 and take-up reel 18 has a diameter represented by circle 42. Finally, at the conclusion of a drive operation, supply reel 19 has a diameter represented by circle 46 and tape-up reel 18 has a diameter represented by circle 43. Thus, all of tape 11 has been unwound from supply reel 19 and rewound onto take-up reel 18. As can be seen in FIG. 1, the angles that tape 11 makes with decoupler column 15 and tape support 16 change during the operation of tape drive 10.

As further shown in FIG. 1, the wrap angle that tape 11 makes around tape support 16 is on the order of 180° with slight changes due to changes in reel diameter as heretofore explained. Having a wrap angle of this magnitude minimizes the influence of take-up reel 18 on tape 11 at read bearing 12. As a result, the possible vibrations of tape 11 at read bearing 12 induced by disturbances at take-up reel 18 are substantially reduced. The possible vibrations of tape 11 at write bearing 13 induced by disturbances at supply reel 19 are reduced by decoupler column 15.

The tension on tape 11 is equal to the pressure sensed by port 17 multiplied by the width of tape 11 multiplied by the air bearing radius. The air bearing radius includes the radius of tape support 16 as well as the distance between the air bearing surface of tape support 16 and the surface of tape 11. As can be seen from this relationship, the tension on tape 11 is directly proportional to the pressure sensed by sense port 17.

Figure 2:
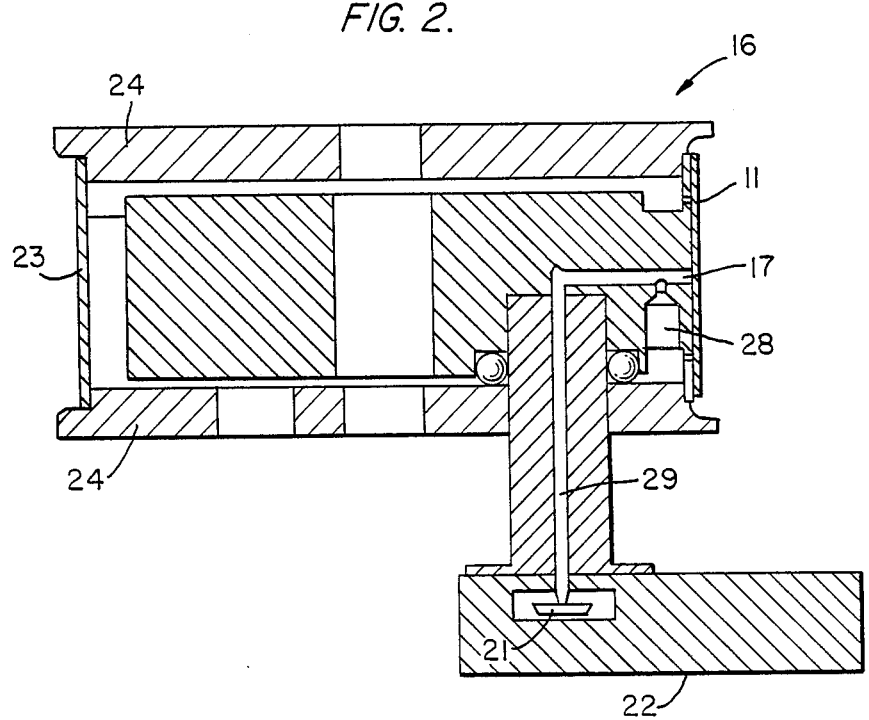
FIG. 2 is an enlarged view of the tape support assembly according to the present invention.

The structure and operation of tape support 16 will now be presented in more detail using FIG. 2. As can be seen, tape support 16 has a substantially cylindrical configuration. Solid state sensing transducer 22 is inserted into a cavity in the bottom side of tape support 16. Sense line 29 extends from silicon crystal 21 within transducer 22 into the body of tape support 16 and terminates at sense port 17. Silicon crystal 21 produces an output proportional to the air pressure sensed at port 17. Purge line 28 provides a flow of air out of sense port 17 thus preventing contaminants from clogging the opening of port 17. There is no air flow from purge line 28 down sense line 29 towards silicon crystal 21. The compacting of air molecules within sense line 29 reflects the pressure sensed at port 17.

The operation of solid state transducer 22, sense line 29, and sense port 17 is similar to a flapper valve. Tape 11 is analogous to the flapper while sense port 17 is analogous to the nozzle in a flapper valve. The major difference between a standard flapper valve and the operation detailed herein is that there is no air flow to solid state transducer 22.

In operation, solid state sensing transducer 22 is first calibrated putting a known amount of tension on tape 11. Transducer 22 produces an output voltage which is proportional to the gain of transducer 22 multiplied by the air pressure measured at sense port 17, plus an offset voltage dependent upon the transducer 22. Once transducer 22 has been calibrated, then the output voltage of transducer 22 will provide a direct indication of the pressure existing at sense port 17 and hence the tension on tape 11. By performing the calibration in this manner, the output voltage of transducer 22 can be used to directly determine the tension on tape 11. The values of the pressure sensed at port 17, the width of tape 11, and the radius of tape support 16 will all be subsumed in the output voltage of transducer 22. Thus in order to determine the tension on tape 11, it will only be necessary to measure the output voltage of transducer 22.

Arcuate surface 23 forms the air bearing surface over which tape 11 passes. Small apertures 37 (FIG. 3a) in arcuate surface 23 allow air under pressure to be forced out through apertures 37 so as to provide an air cushion over which tape 11 travels. Apertures 37 are located in only half of arcuate surface 23. This will be explained in greater detail with relation to FIG. 3a. The creation of such an air bearing surface is well known in the art and need not be detailed herein. Purge line 28 is connected to the same supply of pressurized air which creates the air bearing surface. As long as an air bearing surface is created by the expelling of air through apertures 37 in arcuate surface 23, purge line 28 will be effective to force contaminants out of the opening of sense port 17. The air flowing out of sense port 17 will also prevent tape 11 from collapsing on port 17 due to a vacuum within sense line 29. Such a vacuum would prevent the operation of solid state tension transducer 22.

Figure 3A:
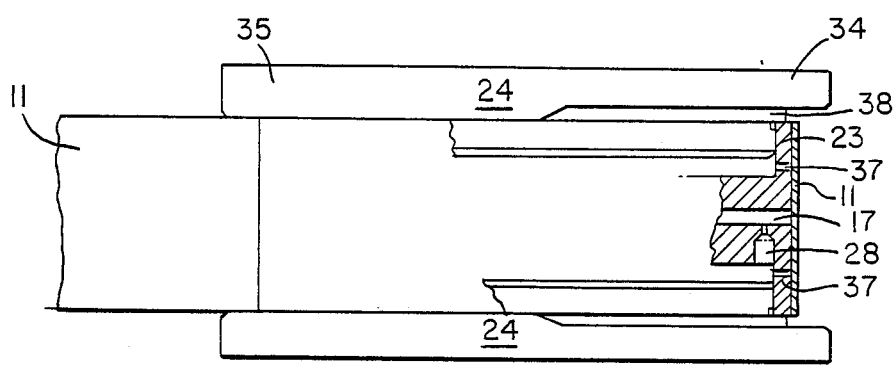
FIG. 3a is sectional view of the tape guiding apparatus of the tape support assembly.
Figure 3B:
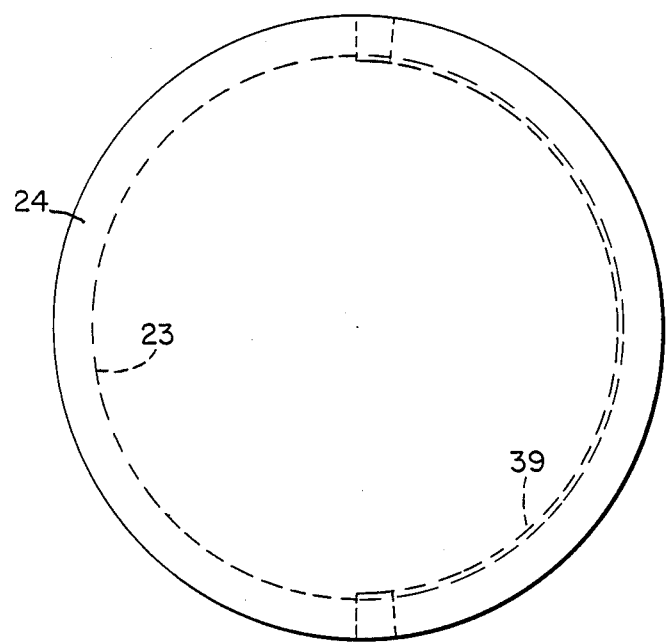

Flanges 24 are affixed to the top and bottom ends of tape support 16. A more detailed explanation of their structure will be presented in relation to FIGS. 3a and 3b. Flanges 24 help guide tape 11 over arcuate surface 23. Without flanges 24, tape 11 would become skewed with respect to arcuate surface 23 and could under appropriate circumstances allow tape 11 to move away from sense port 17 so that the tension on tape 11 could not be measured. Referring now to FIG. 3a, flanges 24 each comprises a first semidisk-shaped member 34 as well as a second semidisk-shaped member 35 joined together. The thickness of the peripheral portion of members 34 is less than the thickness of the peripheral portion of members 35. Apertures 37 and hence the air bearing are located in the half of arcuate surface 23 which is adjacent to the thinner sections of flanges 24, i.e., adjacent to members 34. The reduced thickness of members 34 forms vents 38 between arcuate surface 23 and members 34. Vents 38 allow air from apertures 37 in arcuate surface 23 to escape without impedance thereof and as a result prevent the edges of tape 11 from contacting members 34. This reduces edge wear on tape 11. As an additional aid to reducing edge wear on tape 11, the distance between members 34 is somewhat greater than the width of tape 11. Vents 38 also reduce disturbance induced vibration in tape 11.

The greater thickness of members 35 constrains tape 11 and forces it to be guided by the portion of arcuate surface 23 between members 34. The only places where tape 11 contacts flanges 24 is where members 34 and 35 are joined. Thus, these are the only places where vertical edge guiding of tape 11 occurs. While the wrap angle of the tape would effect the length and angle of contact, the tape would never contact the thin peripheral portion of semidisk-shaped member 34. Lip 39, shown in FIG. 3b, mates with arcuate surface 23 and forms a portion of vents 38.

As is well known, one end of tape 11 is affixed to a leader block (not shown) which is wider than tape 11 and also wider than the distance between members 34. The leader block facilitates load and unload operations. During load and unload operations, no air bearing exists in arcuate surface 23. Members 34 of flanges 24 prevent the leader blocks from crashing and/or dragging on the air bearing portion of arcuate surface 23.

While the invention has been particularly shown and described with reference to a preferred embodiment thereof, it will be understood by those skilled in the art that the foregoing and other changes in form and detail may be made therein without departing from the spirit and scope of the invention. It will be noted especially that although air has been described as creating the interface between tape and tape guiding surface, any appropriate gaseous medium may be used to create a gaseous cushion over which the tape travels.

What is claimed is:

1. A tape drive including a substantially cylindrical tape support having an arcuate surface around which a tape is passed and top and bottom ends, said arcuate surface having a plurality of apertures therein through which a gaseous medium can be supplied under pressure for supporting said tape on a gaseous cushion, said tape drive comprising:

a port in said arcuate surface for sensing gaseous pressure between said tape and said arcuate surface;

a solid state sensing transducer connected to said bottom end of said substantially cylindrical tape support and extending perpendicular therefrom, said transducer coupled to said port by a right angle sense line, containing compacted molecules of said gaseous medium, said sense line having substantially the same internal diameter from said port to said transducer, said transducer first calibrated by putting a known amount of tension on said tape such that said transducer produces an output voltage proportional to the gain of said transducer multiplied by the air pressure measured at said port plus an offset voltage dependent upon said transducer, after calibration the output voltage of said transducer providing a direct indication of the pressure existing at said port and the tension on said tape a purge line located at the port end of said sense line providing a continuous air flow out of said sense line keeping said port clear of contaminants and preventing said tape from collapsing on said port due to a vacuum within said sense line; and first and second flanges affixed to the top and bottom ends, respectively, of said substantially cylindrical tape support for guiding said tape at a wrap angle on the order of 180 degrees around said arcuate surface and for maintaining said tape in substantially constant proximity to said port, said first and second flanges each comprising a first semidisk-shaped section, and a second semidisk-shaped section joined to said first semidisk-shaped section, said tape contacting the flanges and being guided thereby only at the points where said first semidisk-shaped and second semidisk-shaped sections are joined, said first semidisk-shaped section having a peripheral portion of a thickness less than the thickness of the peripheral portion of said second semidisk-shaped section, to form vents so that the edges of said tape will not contact said first semidisk-shaped section and said gaseous medium can escape to prevent tape vibration caused by a take-up reel.

2. A tape drive including a substantially cylindrical tape support having an arcuate surface around which a tape is passed and top and bottom ends, said arcuate surface having a plurality of apertures therein through which a gaseous medium can be supplied under pressure for supporting said tape on a gaseous cushion, said tape drive comprising:

a port in said arcuate surface for sensing gaseous pressure between said tape and said arcuate surface;

first and second flanges affixed to the top and bottom ends respectively, of said substantially cylindrical tape support for guiding said tape at a wrap angle on the order of 180 degrees around said arcuate surface and for maintaining said tape in substantially constant proximity to said port, said first and second flanges each comprising a first semidisk-shaped section, and a second semidisk-shaped section joined to said first semidisk-shaped section, said tape contacting the flanges and being guided thereby only at the points where said first semidisk-shaped and second semidisk-shaped sections are joined, said first semidisk-shaped section having a peripheral portion of a thickness less than the thickness of the peripheral portion of said second semidisk-shaped section, to form vents so that the edges of said tape will not contact said first semidisk-shaped section and said gaseous medium can escape to prevent tape vibration caused by a take-up-reel;

a solid state sensing transducer connected to said bottom end of said substantially cylindrical tape support and extending perpendicular therefrom, said transducer coupled to said port by a right angle sense line, containing compacted molecules of said gaseous medium, said sense line having substantially the same internal diameter from said port to said transducer, said transducer first calibrated by putting a known amount of tension on said tape such that said transducer produces an output voltage proportional to the gain of said transducer multiplied by the air pressure measured at said port plus an offset voltage dependent upon said transducer, after calibration the output voltage of said transducer providing a direct indication of the pressure existing at said port and the tension on said tape.

* * * * *